United States Patent [19]

Williams

[11] Patent Number: 4,480,629

[45] Date of Patent: Nov. 6, 1984

[54] GAS FURNACE SYSTEM

[76] Inventor: Michael Williams, 193 W. Muskegon Ave., Cedar Springs, Mich. 49319

[21] Appl. No.: 523,667

[22] Filed: Aug. 15, 1983

[51] Int. Cl.³ .............................................. F24H 3/00
[52] U.S. Cl. .............................. 126/99 R; 126/110 C; 126/112; 126/116 A
[58] Field of Search .......... 126/99 R, 110 R, 110 AA, 126/110 B, 110 C, 116 R, 116 A, 116 B, 117, 112, 92 C; 432/222; 237/55; 431/328

[56] References Cited

U.S. PATENT DOCUMENTS

| | | | |
|---|---|---|---|
| 2,769,504 | 11/1956 | Miller | 432/222 |
| 2,962,218 | 11/1960 | Dibert | 126/117 |
| 3,261,597 | 7/1966 | McGough | 126/110 C |
| 3,265,376 | 8/1966 | Spielman | 126/110 C |
| 3,995,991 | 12/1976 | Wilkinson | 432/222 |
| 4,012,191 | 3/1977 | Lisankie | 237/55 |
| 4,053,279 | 10/1977 | Eichenlaub | 126/92 C |
| 4,175,538 | 11/1979 | McCarty | 126/99 R |
| 4,217,877 | 8/1980 | Uhlyarik | 126/99 R |
| 4,345,897 | 8/1982 | Stanton | 126/117 |
| 4,383,824 | 5/1983 | Findlay | 432/222 |

*Primary Examiner*—Daniel J. O'Connor
*Attorney, Agent, or Firm*—Varnum, Riddering, Schmidt & Howlett

[57] ABSTRACT

Apparatus is disclosed for operating a gas furnace system (100) having an air intake (102) for supplying external air into a sealed chamber (110) for input to a gas burner assembly (118). Exhaust air from within the combustion burning chamber (140) is applied through an exhaust duct (170) directly into an environment (174) which is external to the furnace system (100) but which is still within the environment to be heated. The furnace system (100) also includes a conventional fan limit assembly (142) wherein the typical high limit setting is substantially decreased so that a blower fan (160) is activated at lower than normal temperatures. In addition, the conventional gas furnace burner is replaced with a burner assembly (118) having substantially small burner ports (130).

10 Claims, 5 Drawing Figures

GAS FURNACE SYSTEM

DESCRIPTION

1. Technical Field

This invention relates to energy devices and, more particularly, to apparatus for operating gas furnace systems.

2. Background Art

Gas furnace systems for heating various types of residential and commercial environments have long been known in the prior art. However, in view of the rapid increase in fuel costs during the recent past, means for making such systems more efficient have been of primary importance to energy system designers.

One problem with many of the prior art arrangements for providing more efficient energy furnace systems is the requirement that the various means for providing such efficiency require a substantial redesign and redevelopment of existing systems. That is, various means for saving energy have not been particularly suited for retrofit into conventional gas furnace systems.

Another problem with many of the recently developed energy savings arrangements is the substantial expense involved in manufacturing and constructing such arrangements. For typical residential users, if the expense of providing energy saving devices is substantial, the users lose the primary advantage of such devices with regard to their savings in fuel costs. That is, the cost of constructing and implementing such energy saving devices is greater than the resultant savings in fuel costs.

Several types of energy savings devices in gas furnaces and other arrangements have utilized feedback concepts. For example, the U.S. Pat. No. 115,956 to Hewes is an early disclosure of a coal burning furnace having a feedback arrangement whereby gases from the upper part of the furnace chamber are fed back into the combustion chamber and reconsumed.

Other energy saving devices have been specifically directed to gas furnace systems having conventional burner assemblies. For example, the U.S. Pat. No. 3,051,464 to Yeo et al describes a detailed configuration for a high turn-down gas burner. Similarly, the U.S. Pat. No. 4,023,923 to Kramer, Jr. is also directed to an improved burner arrangement and describes a burner consisting of a tapered combustion chamber with air ports extending through lateral perforations in the chamber walls.

Other energy saving devices comprise means for reconfiguring or adding to the structure of conventional gas furnaces. For example, the U.S. Pat. No. 4,161,941 to Bloxham describes an air inlet apparatus which feeds cold or fresh air into a conventional cold air return near the furnace combustion chamber. When cold air is heated, it is caused to expand and creates a slightly positive pressure in the house, thereby limiting the possibility of drawing outside air into the house in the form of drafts.

The U.S. Pat. No. 4,217,877 to Uhlyarik describes a forced air furnace having refractory plates serially positioned within the furnace heating chamber and equally spaced apart therein. Spacing between the plates allows for efficient air circulation within the heat chamber so that energy transmitted by gases entering the chamber may be transferred to and stored by the plates during intervals when a conventional blower is not operating. Heat is thereafter drawn from the plates when the blower is activated.

DISCLOSURE OF THE INVENTION

In accordance with the invention, a furnace system is adapted for use with a substantially clean burning fuel for heating an internal environment. The system includes means for supplying fuel to the system and a combustion means at least partially mounted within a combustion chamber for mixing the fuel and air supply to the combustion means. The combustion means is further adapted to burn the fuel mixture so as to generate heat energy, thereby heating air within the combustion chamber. Exchanger means are spatially coupled to the combustion chamber and responsive to the heating of air within the chamber to heat air flowing externally around the exchanger means. Exhaust duct means having one end connected to the combustion chamber and an opposing end open to the environment to be heated provides a spatial opening through which warm exhaust air from the combustion chamber can be supplied to the environment to be heated.

The furnace system also includes warm air duct means spatially coupled to the exchanger means for supplying air heated by the exchanger means to the environment to be heated. Air flow means are spatially coupled to the warm air duct means for forcing air to be heated around the exchanger means. In accordance with one embodiment of the invention, the air flow means comprises a blower fan.

Cold air duct means return cooled air from the environment to be heated. The furnace system in accordance with the invention also includes a carbon mesh screen positioned within the exhaust duct means to preclude pollutants from entering the environment to be heated through the exhaust duct means.

In accordance with one embodiment of the invention, control means detect the temperature of air within the combustion chamber and control activation of the air flow means in accordance with the detected temperatures. The control means is arranged so that a predetermined temperature of the combustion chamber air at which the air flow means is activated when the temperature of the combustion chamber air is increasing is substantially near a predetermined temperature of the combustion chamber air at which the air flow means is deactivated when the temperature of the combustion chamber air is decreasing.

The furnace system in accordance with the invention also includes an air intake means spatially coupled to the combustion chamber and also spatially coupled to an environment external to the furnace system to supply air to the combustion means. The air intake means is spatially open to a sealed chamber in which the combustion means is at least partially positioned.

BRIEF DESCRIPTION OF THE DRAWINGS

The invention will now be described with respect to the drawings in which.

BEST MODE FOR CARRYING OUT THE INVENTION

Figure 1:
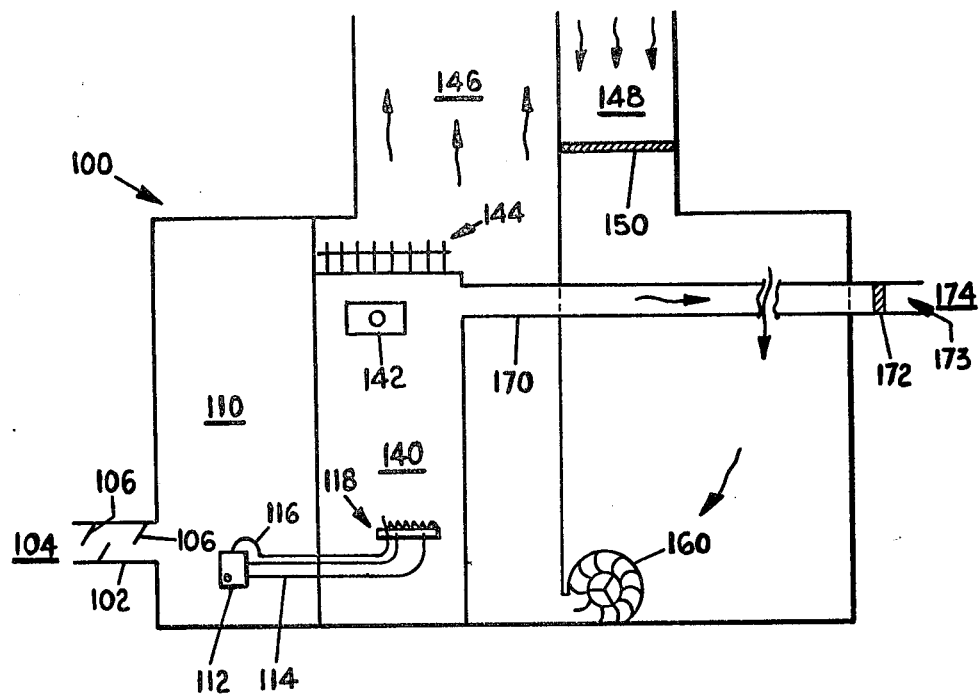
FIG. 1 is a gas furnace system in accordance with the invention.

The principles of the invention are disclosed, by way of example in a gas furnace system 100 as depicted in FIG. 1. Many portions of the furnace system 100 are conventional in nature and exist in natural gas furnace systems presently used in various types of residential and commercial environments. Although the system 100 is specifically adapted for use as a natural gas fed system, furnace systems in accordance with the invention can clearly utilize other types of fuels. However, furnace systems in accordance with the invention must utilize a substantially "clean" fuel in terms of the amount of pollutants and harmful gases resulting from the burning of the fuel.

Referring to FIG. 1, the gas furnace system 100 includes a fresh air intake arrangement 102 adapted to supply air for purposes of fuel combustion. The intake arrangement 102 includes a duct having wind baffles 106 through which air is supplied from the general external environment 104. The intake arrangement 102 can obtain air from outside the particular environment to be heated or, alternatively, can obtain air merely from the external environment of the furnace system 100 but inside the environment to be heated. The purpose of the wind break baffles 106 is to slow down any fast moving air which may flow through the intake arrangement 102 and possibly blow out the pilot light within the burner assembly subsequently described herein. In one embodiment of a furnace system constructed in accordance with the invention, a five inch diameter air intake arrangement 102 was implemented.

Air brought from the external environment 104 into the air intake arrangement 102 is supplied to the chamber 110. Chamber 110 is a sealed chamber which precludes the possibility that air brought from the intake arrangement 102 would be merely heated and blown through the furnace system 100.

Figure 3:
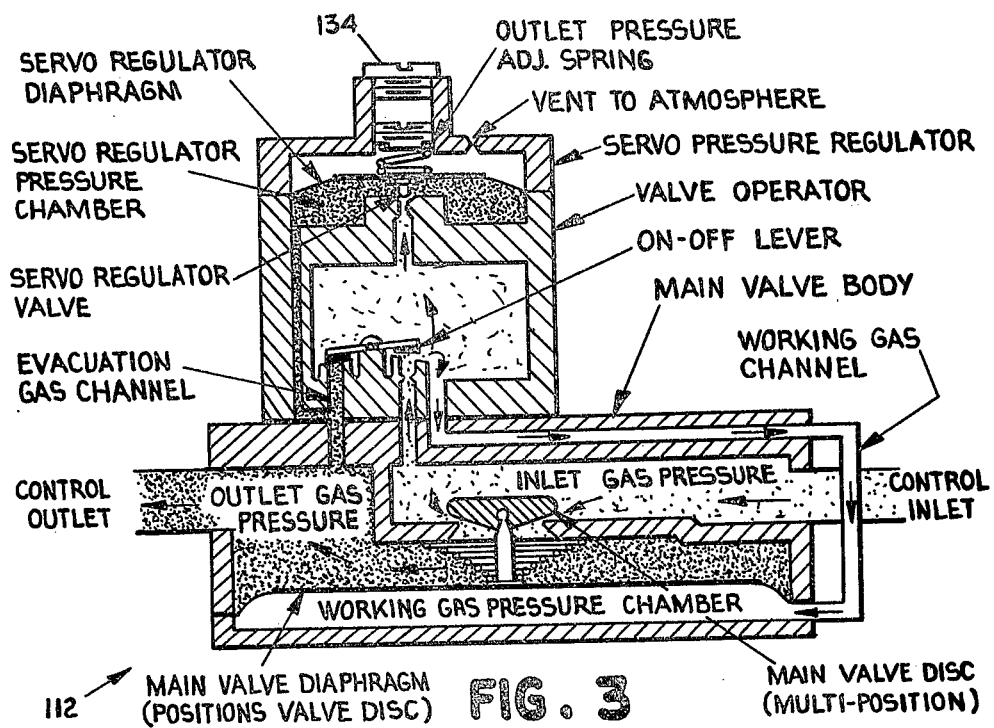
FIG. 3 is a schematic diagram of a gas burner valve control which can be implemented with the gas furnace system depicted in FIG. 1 in accordance with the invention.
Figure 4:
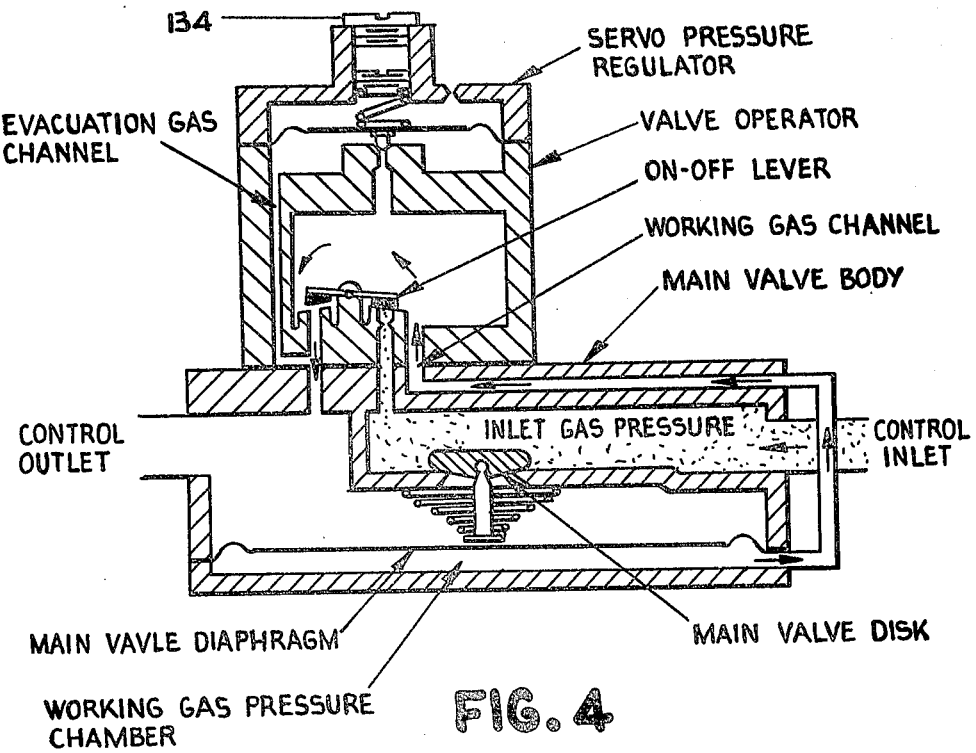
FIG. 4 depicts the gas valve control assembly shown in FIG. 3 with the burner assembly depicted in FIG. 2 in an off position.

Mounted within the sealed chamber 110 is a gas valve control assembly 112 interconnected to a burner assembly 118. The valve control assembly 112 and burner assembly 118 provide a means of combustion for heating air within the furnace system 100. The valve control assembly 112 is interconnected to the burner assembly 118 by means of conventional gas supply lines 114. Also interconnected between the valve control assembly 112 and the burner assembly 118 is a thermocouple 116 as depicted in FIG. 1. The gas valve control assembly 112 is exemplarily depicted in FIGS. 3 and 4. The valve control assembly 112 includes a screw adjustment 134 which is manually adjustable so as to adjust the flame produced by the burner assembly 118 to provide a substantially blue flame, i.e. an efficient mixture of gas and air.

The thermocouple 116 is a conventional thermocouple and detects heat in a manner so that the thermocouple 116 allows gas to be supplied from the gas control valve assembly 112 to the burner assembly 118 only in the presence of sufficient temperature levels. Accordingly, if the conventional pilot light flame on the control valve assembly 112 should be extinguished for any reason, the thermocouple 116 will cool and automatically shut off the gas at the valve control assembly 112.

Figure 2:
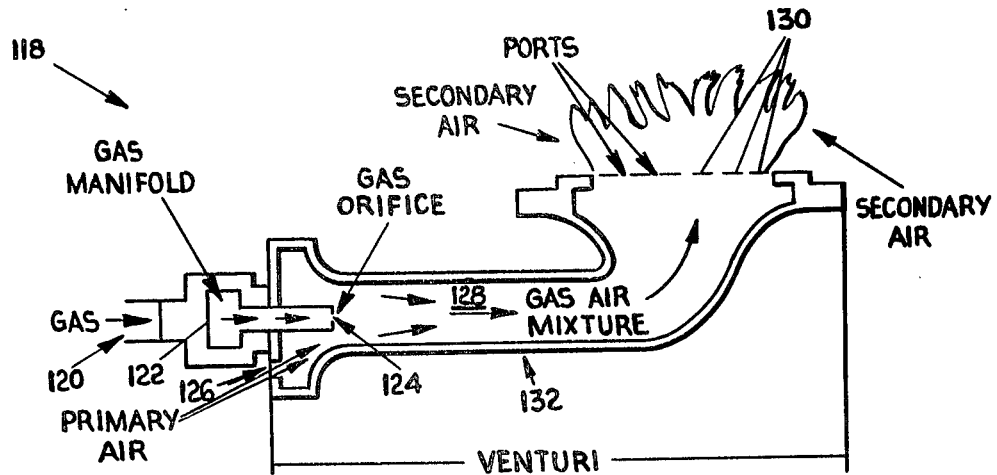
FIG. 2 is a burner assembly which can be utilized in accordance with the gas furnace system depicted in FIG. 1.

The burner assembly 118 is depicted in FIG. 2 and includes a gas inlet port 120 which is interconnected to the gas supply lines 114 depicted in FIG. 1. Mounted within the inlet port 120 is a manifold 122 having a terminating gas orifice 124 therein. As depicted in FIG. 2, a primary air inlet port 126 is mounted within a Venturi portion of the burner assembly 118. The gas orifice 124 extends into the Venturi portion 132 and supplies gas thereto. The mixture of air supplied from primary air inlet port 126 and gas from the orifice 124 is applied through a gas/air duct 128 which comprises a main portion of the Venturi portion 132. The gas/air mixture is supplied to conventional burner ports 130 where a heating flame is thereby generated. Secondary air is supplied from the environment around the external portion of the burner ports 130.

In accordance with the invention, the flame adjustment screw 134 on the gas valve control assembly 112 is adjusted so as to provide a sufficient blue flame at the combustion ports 130. In a reduction to practice of a furnace system 100 in accordance with the invention, a conventional kitchen stove burner was utilized having substantially small burner ports 130 relative to the conventional burner ports utilized in a typical gas furnace system. The implementation of a smaller and more restricted evacuation gas channel within the valve control assembly 112 will provide a substantially well controlled application of gas to the burner port 130.

The thermocouple 116 should be designed so that gas can be shut off within a period of approximately 2.5 minutes should the pilot flame in the valve control assembly 112 be extinguished for any reason. Numerous types of thermocouples 116 can be utilized in accordance with the invention. In addition, a dual thermocouple gas valve control assembly 112 can be implemented.

Referring again to FIG. 1, the burner assembly 118 is mounted within a burner combustion chamber 140. Mounted to the side of the burner chamber 140 is a fan limit control switch 142 which will be subsequently described herein. Above the burner chamber 140 is a conventional heat exchanger 144 which is utilized to supply heat energy to air externally flowing around the exchanger 144 from heated air within the exchanger 144.

The heat exchanger 144 is positioned within the opening of a warm air duct 146 which is utilized to supply warm air to the particular environment to be heated. The arrows depicted in FIG. 1 within the warm air duct 146 indicate the directional flow of air within the duct 146. Adjacent the warm air duct 146 and separated therefrom is a cold air return duct 148 having a conventional filter 150 mounted therein. The cold air return duct 148 is utilized to return cold air from the environment to be heated, with the directional flow of such air shown by the arrows depicted in FIG. 1.

The air returned by cold air return duct 148 supplies air to a conventional blower fan 160. Air having a positive velocity is thereby forced into the area around heat exchanger 144 and made to flow therearound. Heat exchanger 144, with internal air heated by the burner assembly 118, causes the forced air flowing due to the action of fan 160 to be heated. The heated air thereby rises into the warm air duct 146 and is supplied to the environment to be heated.

In accordance with the invention, the burning chamber 140 in which the burner assembly 118 is located is open to an exhaust duct 170 which directs air from the burning chamber 140 through a carbon mesh screen 172 and outlet port 173 into an external environment 174. Although the environment 174 is external to the furnace system 100, it comprises an inner environment to be heated by the furnace system 100. The air supplied through exhaust duct 170 is already heated by the burner assembly 118 within burning chamber 140 and thereby supplies additional heat energy to the environment to be heated.

Figure 5:
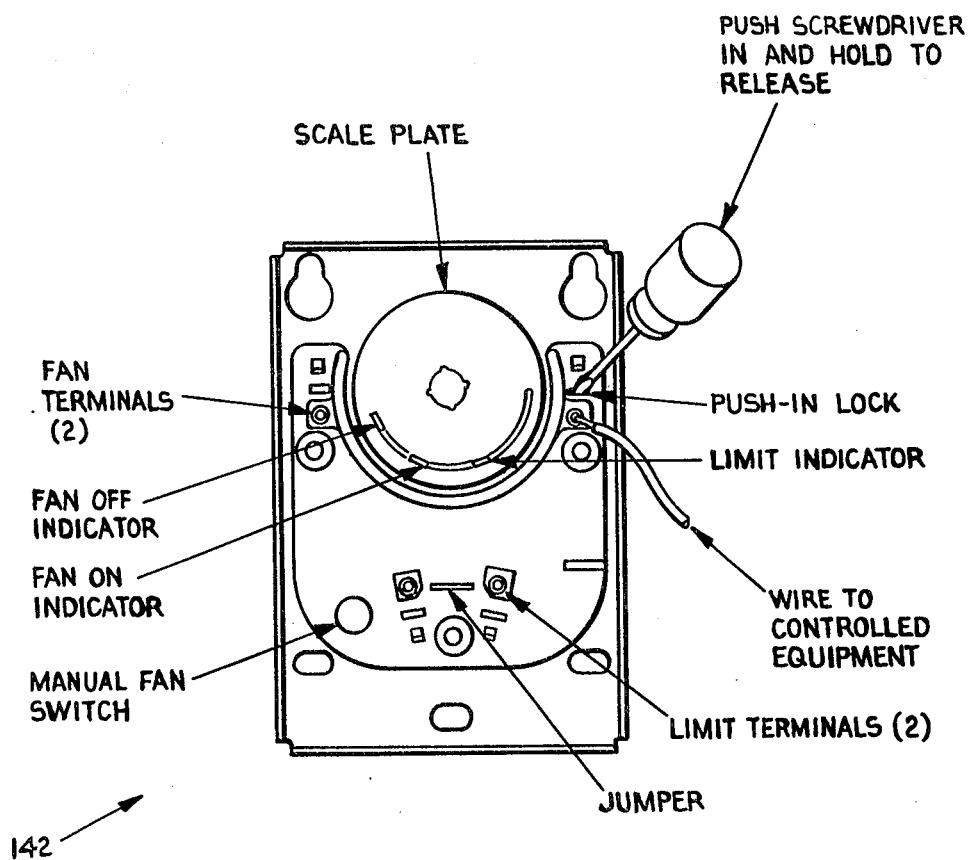
FIG. 5 depicts a fan limit control device which can be utilized with the gas furnace system shown in FIG. 1 in accordance with the invention.

Again referring to FIG. 1, the fan limit control 142 which is mounted to the side of the furnace system 100 is adapted to control activation of the blower fan 160. A typical fan limit control 142 which can be implemented with the gas furnace system 100 in accordance with the invention is depicted in FIG. 5.

The limit control 142 includes conventional means for detecting the temperature of air within the burning chamber 140 and activating or deactivating the blower fan 160 in accordance with the detected air temperature. In conventional systems, when the temperature in the burning chamber 140 obtains a predetermined minimum temperature, the blower fan 160 is activated to supply air up to the heat exchanger 144 and into the warm air duct 146. The fan limit control 142 also typically includes a low temperature setting below the high temperature setting. The low temperature setting causes the blower fan 160 to be deactivated when the temperature in the burning chamber 140 falls below the predetermined low temperature setting.

In accordance with the invention, the typical high temperature limit setting is substantially reduced so that the blower fan 160 is made to operate when the temperature within the burning chamber 140 is relatively low. In so doing, the blower fan 160 will be made to activate at a much lower temperature and heat is allowed to circulate into the warm air duct 146 in the environment to be heated earlier than is normal with a conventional high limit temperature setting on the fan limit control 142. In a reduction to practice of one embodiment in accordance with the invention, the high limit temperature setting was reduced within the range of 40 to 50 below the typical temperature setting.

In retrofitting a gas furnace system 100 in accordance with the invention to a typical gas furnace system, the conventional exhaust or chimney pipe which is located between the burning chamber 140 and a chimney (not shown) within the environment to be heated is removed. Accordingly, heat from the burning chamber 140 is allowed to enter the environment to be heated through the exhaust duct 170.

In testing a reduction to practice of a particular embodiment of the gas furnace system 100 in accordance with the invention, tests with the well-known Bendix Gastec analyzer tubes for detecting carbon monoxide resulted in a finding that only approximately six parts per million of carbon monoxide were found in the environment in which the exhaust gases were supplied through the exhaust duct 170. In accordance with typical governmental standards, such as those supplied by the Environmental Protection Agency, fifty parts per million of carbon monoxide can be within the environment without violating the conventional EPA guidelines.

It should also be emphasized that the heat supplied through the exhaust duct 170 will contain a moderate amount of moisture which is advantageous in containing heat within the environment for a relatively longer period of time. Also, moisture is clearly known to be more healthful for individuals within the environment. The moisture supplied by the air to the exhaust duct 170 can supplement the moisture supplied by the typical furnace humidifier.

Although a gas furnace system 100 in accordance with the invention has been heretofore described for use with natural gas, it is possible to implement a furnace system 100 in accordance with the invention for use with LP, butane or propane gases. The only requirement with regard to the particular fuels utilized with a furnace system in accordance with the invention is that such fuels be sufficiently clean so that a substantial number of pollutants are not supplied within the gases through the exhaust duct 170.

The principles of the invention are not limited to the specific gas furnace system 100 described herein. It will be apparent to those skilled in the art that various other types of furnace systems in accordance with the invention can be utilized without altering the basic concepts of the invention. It will further be apparent to those skilled in the art that modifications and variations of the above-described illustrative embodiment of the invention may be effected without departing from the spirit and scope of the novel concepts of the invention.

The embodiments of the invention in which an exclusive property or privilege is claimed are defined as follows:

1. A furnace system adapted for use with a substantially clean burning fuel for heating an internal environment, the furnace system comprising:
   means for supplying fuel to the furnace system;
   combustion means mounted at least partially within a combustion chamber of the furnace system for mixng the fuel and air supplied to the combustion means, and for burning the fuel mixture so as to generate heat energy, thereby heating air within the combustion chamber;
   exchanger means spatially coupled to the combustion chamber and responsive to heating of air within the combustion chamber to heat air flowing externally around the exchanger means;
   warm air duct means spatially coupled to external surfaces of the exchanger means for supplying air heated by the exchanger means to the environment to be heated;
   air flow means spatially coupled to the warm air duct means for forcing the air to be heated around the external surfaces of the exchanger means;
   cold air duct means for returning cold air from the environment to be heated; and
   exhaust duct means having one end spatially connected to the combustion chamber and an opposing end spatially open to the environment to be heated for providing a spatial opening through which warm exhaust air from the combustion chamber can be supplied from the environment to be heated.

2. A furnace system in accordance with claim 1, wherein the furnace system further comprises control means for detecting the temperature of air within the combustion chamber and controlling activation and deactivation of the air flow means in accordance with the detected temperature, wherein a predetermined temperature of the combustion chamber air at which the air flow means is activated when the temperature of the combustion chamber air is increasing is substantially near a predetermined temperature of the combustion chamber air at which the air flow means is deactivated when the temperature of the combustion chamber air is decreasing.

3. A furnace system in accordance with claim 2 wherein the air flow means is a blower fan and the control means is a fan limit switching device.

4. A furnace system in accordance with claim 3 wherein the combustion means comprises a gas burner assembly positioned within the combustion chamber and having relatively small outlet combustion ports for restricting the flow of fuel within the combustion ports.

5. A furnace system in accordance with claim 4 wherein the furnace system further comprises a carbon mesh screen mounted within the exhaust duct means so as to prohibit exhaust pollutants from entering the environment to be heated.

6. A furnace system in accordance with claim 5 wherein the fuel is a natural gas fuel and the combustion means comprises means for generating a combustion flame having a substantially blue color.

7. A furnace system in accordance with claim 6 wherein the furnace system further comprises air intake means spatially coupled to the combustion means and spatially coupled to an environment external to the furnace system for supplying air to the combustion means.

8. A furnace system in accordance with claim 7 wherein the combustion means further comprises a thermocouple and means for controlling the flow of natural gas within the combustion means, wherein the thermocouple is made to detect the temperature of air surrounding the combustion means and to shut off the flow of gas within the combustion means should the temperature fall below a predetermined temperature.

9. A furnace system in accordance with claim 8 wherein the combustion means is partially located within a sealed chamber spatially open only to the air intake means.

10. A furnace system in accordance with claim 9 wherein the air intake means includes wind break baffles for prohibiting a relatively high velocity of air within the air intake means from extinguishing fuel combustion within the combustion means.

* * * * *